United States Patent
Krause et al.

(10) Patent No.: US 8,498,253 B2
(45) Date of Patent: Jul. 30, 2013

(54) EXCHANGE OF SCHEDULING STRATEGIES FOR INTERFERENCE COORDINATION

(75) Inventors: Jörn Krause, Golfe Juan (FR); Klaus Ingemann Pedersen, Aalborg (DK); Ingo Viering, München (DE)

(73) Assignee: Nokia Siemens Networks Oy, Espoo (FI)

( * ) Notice: Subject to any disclaimer, the term of this patent is extended or adjusted under 35 U.S.C. 154(b) by 305 days.

(21) Appl. No.: 12/674,215

(22) PCT Filed: Aug. 22, 2008

(86) PCT No.: PCT/EP2008/061026
§ 371 (c)(1),
(2), (4) Date: Jul. 2, 2010

(87) PCT Pub. No.: WO2009/024614
PCT Pub. Date: Feb. 26, 2009

(65) Prior Publication Data
US 2011/0110311 A1    May 12, 2011

Related U.S. Application Data

(60) Provisional application No. 60/957,331, filed on Aug. 22, 2007.

(51) Int. Cl.
*H04J 11/00* (2006.01)
*H04J 1/00* (2006.01)
*H04W 4/00* (2009.01)

(52) U.S. Cl.
USPC .......... 370/329; 370/208; 370/328; 370/338; 370/343

(58) Field of Classification Search
None
See application file for complete search history.

(56) References Cited

U.S. PATENT DOCUMENTS

| 2007/0086406 | A1* | 4/2007 | Papasakellariou | 370/343 |
| 2007/0105562 | A1* | 5/2007 | Ji | 455/452.1 |
| 2008/0233967 | A1* | 9/2008 | Montojo et al. | 455/452.2 |

FOREIGN PATENT DOCUMENTS

| CN | 101001097 A | 7/2007 |
| EP | 654 952 A2 | 5/1995 |
| EP | 1 786 221 A1 | 5/2007 |

OTHER PUBLICATIONS

3GPP TR 25.913 V7.3.0 (Mar. 2006), 3rd Generation Partnership Project; Technical Specification Group Radio Access Network; Requirements for Evolved UTRA (E-UTRA) and Evolved UTRAN (E-UTRAN) (Release 7).

(Continued)

*Primary Examiner* — Faruk Hamza
*Assistant Examiner* — Diane Lo
(74) *Attorney, Agent, or Firm* — Harrington & Smith (57) ABSTRACT

A cell informs surrounding cells about an orthogonal resource allocation strategy of the informing cell so as to induce cooperative behavior among the cells. The informing cell also receives resource allocation strategies from the surrounding cells. Each cell allocates its orthogonal resources according to the mutually exchanged information. The result is to reduce interference in the system. For example, a BS informs other cells on which clusters it generates a small interference, e.g., close UEs concentrated into a particular cluster, and indicate that to its neighbors. Other cells would concentrate UEs which are on the edge to the indicating cell exactly in this cluster. This would mean an "overload invitation", i.e. inviting the neighbors to produce overload on a particular cluster. If a cell sends an overload invitation on a sufficiently large cluster, this will automatically reduce the interference in the other clusters.

19 Claims, 4 Drawing Sheets

OTHER PUBLICATIONS

3GPP TR 25.813 V7.1.0 (Sep. 2006, 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7).

* cited by examiner

EXCHANGE OF SCHEDULING STRATEGIES FOR INTERFERENCE COORDINATION

CROSS-REFERENCE TO RELATED APPLICATIONS

This is a national stage filing under 35 USC 371 of International Application No. PCT/EP2008/061026 filed Aug. 22, 2008, which claims priority on U.S. provisional patent application No. 60/957,331 filed Aug. 22, 2007.

BACKGROUND

1. Technical Field

The invention relates to wireless communications and, more particularly, to a strategies for reducing interference.

2. Discussion of Related Art

ABBREVIATIONS

3GPP Third generation partnership program
aGW Access Gateway
DFT Discrete Fourier Transform
eNodeB E-UTRAN Node B
EPC Evolved Packet Core
E-UTRAN Enhanced-UTRAN
FDMA Frequency Division Multiple Access
IBI Inter Block Interference
ISI Inter Symbol Interference
LTE Long Term Evolution
MAC Medium Access Control
MME Mobility Management Entity
NAS Non Access Stratum
OFDM Orthogonal Frequency Division Multiplexing
OFDMA Orthogonal Frequency Division Multiple Access
OI Overload Indicator
PAPR Peak-to-Average Power Ratio
PHY Physical Layer
RACH Random Access Channel
RLC Radio Link Control
RRC Radio Resource Control
SAE System Architecture Evolution
SC-FDMA Single Carrier FDMA
TTI Transmission Time Interval
UL Uplink
UMTS Universal Mobile Telecommunications System
UPE User Plane Entity
UTRAN UMTS Terrestrial Radio Access Network
WCDMA Wideband Code Division Multiple Access
WiMAX Worldwide Interoperability for Microwave Access LTE, or Long Term Evolution (also known as 3.9G), refers to research and development involving the Third Generation Partnership Project (3GPP) aimed at identifying technologies and capabilities that can improve systems such as the UMTS. Information about LTE can be found in 3GPP TR 25.913, Requirements for Evolved UTRA (E-UTRA) and Evolved UTRAN and also in 3GPP TR 25.813, Evolved UTRA and UTRAN—Radio interface protocol aspects. This invention arose in the context of developments underway in the LTE but is not necessarily limited to that context and could, for instance, be applied in any wireless communications context such as a WiMAX context.

Figure 1:
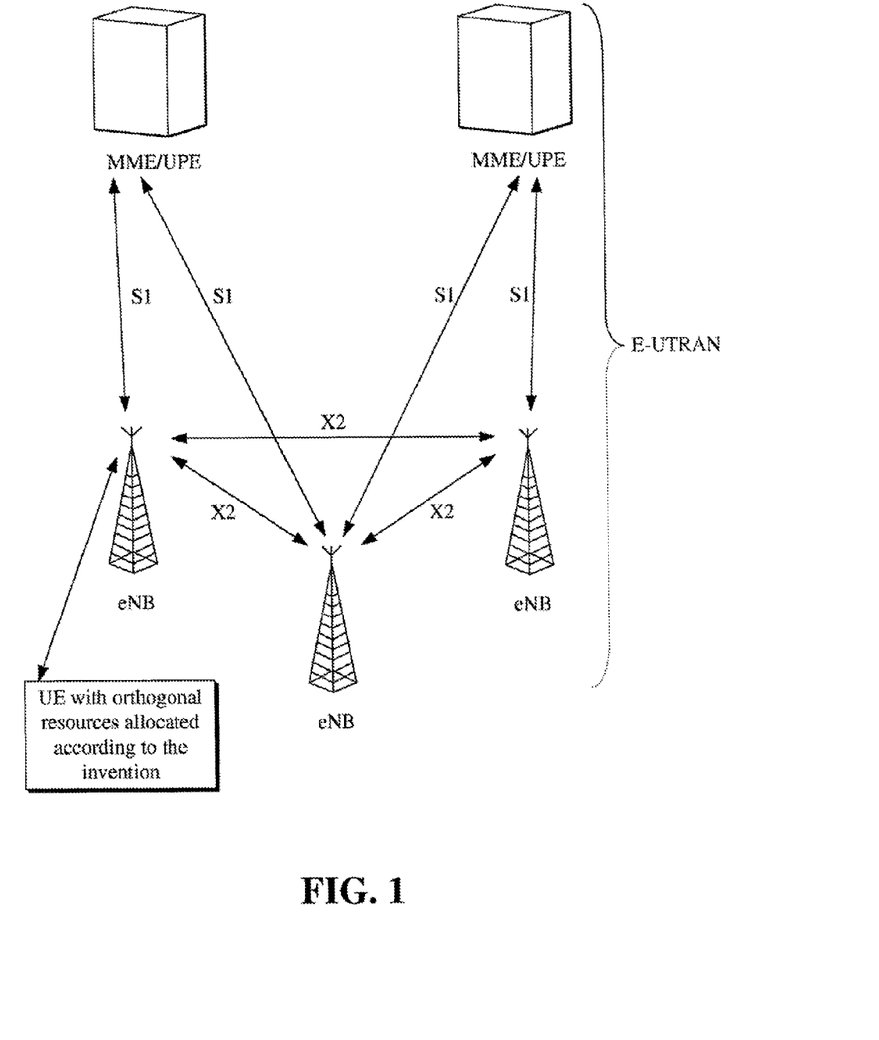
FIG. 1 shows a mobile communications system architecture.

An example of the E-UTRAN architecture is illustrated in FIG. 1. It comprises eNBs, providing E-UTRA user plane (RLC/MAC/PHY) and control plane (RRC) protocol terminations towards the UE. The eNBs are interconnected with each other by means of an X2 interface. The eNBs are also connected by means of an S1 interface to an EPC (evolved packet core) more specifically to an MME (mobility management entity) and a UPE (user plane entity). The S1 interface supports a many-to-many relation between MMEs/UPEs and eNBs. The S1 interface supports a functional split between the MME and the UPE. The MMU/UPE in the example of FIG. 1 is one option for the access gateway (aGW).

The eNB may host functions such as radio resource management (radio bearer control, radio admission control, connection mobility control, dynamic allocation of resources to UEs in both uplink and downlink), selection of a mobility management entity (MME) at UE attachment, routing of user plane data towards the user plane entity (UPE), scheduling and transmission of paging messages (originated from the MME), scheduling and transmission of broadcast information (originated from the MME or O&M), and measurement and measurement reporting configuration for mobility and scheduling. The MME/UPE may host functions such as the following: distribution of paging messages to the eNBs, security control, IP header compression and encryption of user data streams; termination of U-plane packets for paging reasons; switching of U-plane for support of DE mobility, idle state mobility control, SAE bearer control, and ciphering and integrity protection of NAS signaling. The invention is related to LTE, although the solution of the present invention may also be applicable to present and future systems other than LTE.

It is currently contemplated that the LTE downlink air interface will use Orthogonal Frequency Division Multiplexing (OFDM). OFDM is a digital multi-carrier scheme, which uses a large number of closely-spaced orthogonal sub-carriers. Each sub-carrier is modulated with a conventional modulation scheme. The primary advantage of OFDM over the single-carrier W-CDMA architecture of UMTS is its ability to cope with severe channel conditions—for example, narrowband interference and frequency-selective fading due to multi-path effects—without the need for complex equalization filters. Channel equalization is simplified because OFDM may be viewed as using many slowly-modulated narrowband signals rather than one rapidly-modulated wideband signal. Low symbol rate makes the use of a guard interval between symbols affordable, making it possible to handle time-spreading and eliminate inter-symbol interference (ISI).

Single Carrier Frequency Division Multiple Access (SC-FDMA) is currently a working assumption for the uplink multiple access scheme in LTE. SC-FDMA utilizes single carrier modulation and frequency domain equalization is a technique that has similar performance and essentially the same overall complexity as OFDM. SC-FDMA can be regarded as DFT-precoded or DFT-spread OFDM. An advantage over OFDM is that the SC-FDMA signal has lower peak-to-average power ratio (PAPR) because of its inherent single carrier structure. The lower PAPR of SC-FDMA greatly benefits the mobile terminal in terms of transmit power efficiency.

In any event, both OFDMA and SC-FDMA use block-based modulation, divide the transmission bandwidth into smaller subcarriers, carry out channel equalization in the frequency domain and add a cyclic prefix (CP) (guard interval) to overcome Inter-Block Interference (IBI) and to convert linear convolution of the channel impulse response to a circular one for easy frequency domain equalization at the receiver end.

Intercell Interference is a key problem in cellular communication systems such as LTE. Both the uplink and downlink are affected. In the downlink, a User Equipment (UE) gets interfered with by neighboring Base Stations (BSs), i.e., eNBs. This generates problems in UEs at the cell edge since the interference is largest there. In the uplink, a base station receives interference by UEs which are connected to other BSs. This interference is worst, if the "aggressor" UE is close to the cell edge. Close UEs in the cell of interest may well have sufficient power to drown out the worst-case interference from foreign edge UEs, but own edge UEs probably won't. The key to an efficient system is a smart management of the intercell interference. Note that data rates at the cell edge are a crucial design criterion for any communication system.

It is well understood that the above-mentioned problem is a greater problem in the uplink.

Being an OFDMA/SC-FDMA system, LTE initially has no capability for interference averaging as in WCDMA or WiMAX. On the other hand, the design of LTE opens new options of interference coordination because of the fact of the information being carried on multiple sub-carriers. Interference on one frequency only affects the same frequency in a neighbor cell. The principle idea in the UL is that one cell uses parts of the spectrum for cell edge users and other parts for center users. Neighboring cells would do this vice versa. As a consequence, every cell produces high interference to others on parts of the spectrum where the UEs of the other cells have sufficient power to drown out the interference. Power limited UEs should use the other part of the spectrum where other cells produce smaller interference.

However, it has already been decided, that there will be no central entity (comparable to the RNC in UMTS) which is able to take over the functionality to coordinate the cells' spectrum usage. In particular, such coordination should be dynamic at least to some extent, in order to track changes in the traffic.

As a consequence such coordination has to be self-organized, i.e. the BSs can exchange some information mutually, but have to make their own decisions.

Unfortunately, vendors are very reluctant to standardize the exact procedures. In principle, just the signalling between the BS will be standardized, but not the reaction on the signalling. That will be vendor-specific.

The basic problem is that every BS wants a large part of the spectrum with very low interference, in order to maximize its own throughput. However, in doing so the BS produces high interference on a large part of the spectrum to its neighbors. At the end of the day, we have a game theory problem here.

As already mentioned above, interference averaging to mitigate inter-cell interference (as in WCDMA and WiMAX) is not an option in LTE. Furthermore, Soft Handover (which is an efficient method for interference mitigation) has been excluded from LTE as well. Another solution could be interference cancellation, where the BS tries to cancel interference from aggressor UEs exploiting e.g. the spatial signature of the interference. Those methods are typically vendor-specific and need not to be standardized. It has also already been mentioned above that a centralized interference coordination scheme has been excluded.

Currently it is discussed to specify an "Overload Indicator" (OI) which is signalled on the X2 interface shown in FIG. 1 between the BSs. The idea is to give an indication to other cells if the interference in particular parts ("clusters") of the spectrum is too high. A cluster may for instance be part of a spectrum, i.e., a particular frequency region consisting of several physical radio blocks. The OI is frequency resolved, i.e., there is one OI per cluster. When receiving an OI for a particular cluster, it is expected that other BSs reduce the interference on that cluster.

However, as already mentioned, it will not be specified how BSs have to react to the receipt of OIs. We see two different problems:

Every BS can receive OIs from every surrounding cell. It may well happen, that every cell requests another cluster with low interference such that no cluster is left for high interference. In such a case, the BS has to violate/ignore some OIs if it wants to schedule cell edge users.

It is not obvious, that a BS will experience a benefit by its own, if it reacts on an OI. Initially, it has to apply more sophisticated algorithms to avoid cell edge UEs in the indicated clusters (scheduler constraint).

We think that the current idea of OIs will not have much of a chance to lead to a well-coordinated stable condition which is anywhere close an optimal setting (which a centralized algorithm could achieve).

Another problem is the clustering. On the one hand, it is clear that a fine granularity of the clusters can achieve the most sophisticated coordination. However, this just applies to the isolated coordination problem. The clustering imposes a scheduler constraint, i.e. the scheduler is no longer able to freely schedule the users anywhere in the frequency domain, which is enormously important for multi-user diversity and hence for high spectral efficiency.

A danger can be foreseen that the OIs will not even be used later on because of these problems.

SUMMARY

The goal is to design the signalling and the reaction thereto such that every BS is rewarded if it shows a cooperative behavior, and therefore the BSs should be motivated to do so. In other words, it should be avoided that every BS claims large spectrum parts with small interference, since an optimal over-all solution in such an event probably cannot be found.

According to a first embodiment, a method is provided comprising a cell of a cellular system informing surrounding cells about a resource allocation strategy of said informing cell for allocating orthogonal resources of the informing cell, said informing cell also receiving resource allocation strategies from said surrounding cells indicative of allocation strategies of said surrounding cells for allocating orthogonal resources of said surrounding cells, and said informing cell allocating said orthogonal resources of the informing cell according to both said resource allocation strategy of the informing cell and the resource allocation strategies received from the surrounding cells so as to reduce interference in the system. For instance, the cell informs its strategy comprising allocating a frequency range where it will produce small interference, that is, allocating said frequency range to user equipment near a cell center.

According to a second embodiment, a method comprises a cell of a cellular system determining a resource allocation strategy of said cell for allocating orthogonal resources of the cell, said cell also checking resource allocation strategies of surrounding cells indicative of allocation strategies of said surrounding cells for allocating orthogonal resources of said surrounding cells, and said cell allocating said orthogonal resources of the cell according to both said resource allocation strategy of the cell and the resource allocation strategies of the surrounding cells. For instance, the cell may determine said strategy by allocating a frequency range where it will produce small interference, that is, allocating said frequency range to user equipment near a cell center.

According to a third embodiment, apparatus for a cell of a cellular system is provided, comprising a transmitter for informing surrounding cells about a resource allocation strategy of said informing cell for allocating orthogonal resources of the informing cell; a receiver for receiving resource allocation strategies from said surrounding cells indicative of allocation strategies of said surrounding cells for allocating orthogonal resources of said surrounding cells; and a signal processor for allocating said orthogonal resources according to both said resource allocation strategy of the informing cell and the resource allocation strategies received from the surrounding cells so as to reduce interference in the system. For instance, the cell informs its strategy comprising allocating a frequency range where it will produce small interference, that is, allocating said frequency range to user equipment near a cell center.

According to a fourth embodiment, apparatus for a cell of a cellular system is configured to determine a resource allocation strategy of said cell for allocating orthogonal resources of the cell, to check resource allocation strategies of surrounding cells indicative of allocation strategies of said surrounding cells for allocating orthogonal resources of said surrounding cells, and to allocate said orthogonal resources according to both said resource allocation strategy of the cell and the resource allocation strategies of the surrounding cells. The cell may determine said strategy by allocating a frequency range where it will produce small interference, that is, where it allocates said frequency range to user equipment near a cell center.

According to a fifth embodiment, apparatus comprises means for a cell of a cellular system for informing surrounding cells about a resource allocation strategy of said informing cell for allocating orthogonal resources of the informing cell, said informing cell also comprising means for receiving resource allocation strategies from said surrounding cells indicative of allocation strategies of said surrounding cells for allocating orthogonal resources of said surrounding cells, and said informing cell comprising means allocating said orthogonal resources of the informing cell according to both said resource allocation strategy of the informing cell and the resource allocation strategies received from the surrounding cells so as to reduce interference in the system.

According to a sixth embodiment, apparatus comprises means for a cell of a cellular system to determine a resource allocation strategy of said cell for allocating orthogonal resources of the cell, said apparatus also comprises means for checking resource allocation strategies of surrounding cells indicative of allocation strategies of said surrounding cells for allocating orthogonal resources of said surrounding cells, and said apparatus further comprises means for allocating said orthogonal resources of the cell according to both said resource allocation strategy of the cell and the resource allocation strategies of the surrounding cells.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

From a game theory perspective, the current idea for use of overload indicators (OIs) as described above is an egoistic request. We think it is much better for a base station of a cell to inform other base stations of other cells about its own strategy, rather than requesting a particular behavior on the part of other base stations to advance its own ends. In the latter case the requesting base station strongly depends on a particular behavior/reaction from the surrounding base stations in response to the OIs. This may not be advantageous for the base stations receiving the request and they therefore might not comply.

More specifically, we propose to instead inform by having the base station indicate to other base stations its own resource allocation strategy, e.g., the identity of those clusters on which the base station generates small interference. E.g., a cell would try to concentrate close UEs into a particular cluster, and indicates that to its neighbors. From a game theory perspective, this would likely induce the most cooperative behavior and therefore should achieve the maximum system gain.

Figure 2:
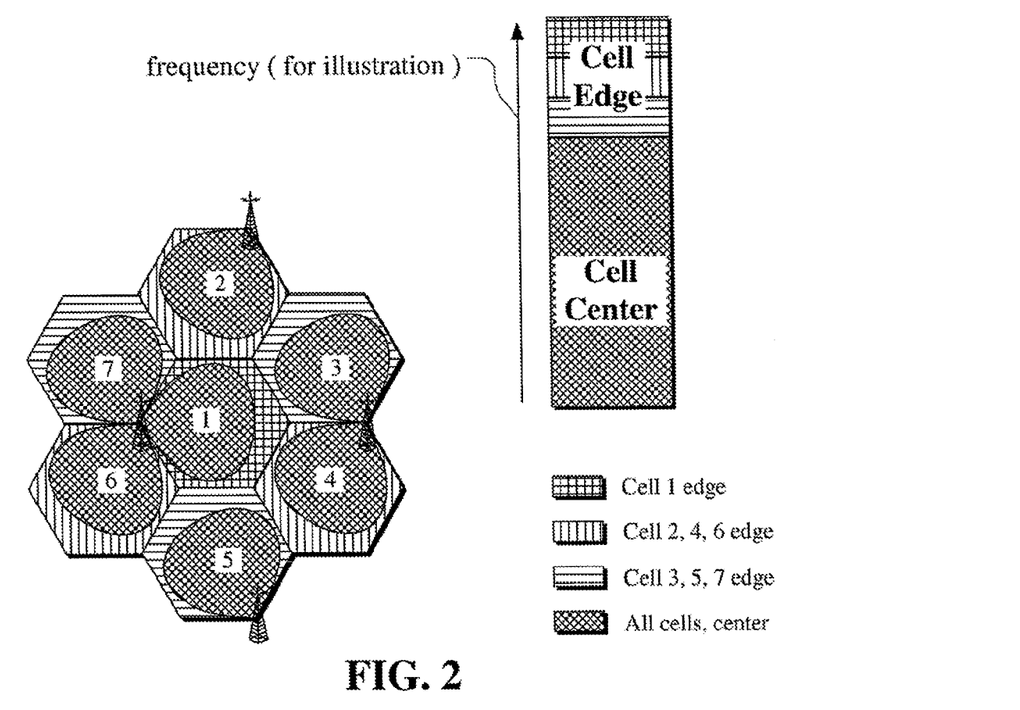
FIG. 2 shows the present invention applied to the uplink in a cellular system.

The reaction of the other cells would be straightforward, e.g., they would concentrate UEs which are on the edge to the informing cell exactly in this cluster indicated by its neighbor cell. This is shown in FIG. 2.

In principle, this would be more like an "overload invitation", i.e. the base station invites the neighbors to produce overload on a particular cluster.

However, we have to think about what motivates a cell to indicate an overload invitation. If a cell signals small interference to its neighbors, other cells will most likely schedule the "dangerous" UEs exactly on this cluster, because this will give best performance to the edge users. In the ideal case, this removes dangerous interference from the other part of the spectrum. In other words, if a cell sends an overload invitation on a sufficiently large cluster, this will automatically reduce the interference in the other clusters. If a cell does not send such an invitation or if a reliance is placed on the presently contemplated OI then the neighbors will not concentrate their interference and thus produce totally uncoordinated interference.

Note that we just have specified the signalling, and not the exact procedures (which is inline with the current philosophy). Everybody gets rewarded if he behaves as expected:

Other cells will schedule their edge users on the invited cluster (this obviously leads to a direct benefit for them)

A cell gets rewarded if it signals an overload invitation as described above.

Note that if neighboring cells indicate exactly the same cluster, then there may be the problem that edge users of those two cells can collide. Other cells are not affected.

In principle, this could be achieved even without signalling, purely being based on a base station's own measurements. If a cell starts concentrating its center users in a cluster, other cells will automatically measure smaller interference. However, there are three reasons why an explicit signalling may help:

Specifying the signalling at least gives a paradigm for the expected behaviour.

It may be that two neighbors indicate the same cluster. Without signalling, it would not be clear who should signal another cluster. With signalling, we can set very simple rules, such as "the one with the smaller cell-ID" does some prearranged step to avoid the conflict.

Measuring the interference is sluggish (long averaging necessary), erroneous and vendor-specific in general. With signalling, we will end up in much more reliable procedures.

As an alternative, a cell could signal those clusters where it produces high (rather than low) interference. This would be more like an "overload warning." Other cells would be informed that they should not use those clusters for their own edge users. This would be close to the current discussion with the small difference that we do not request and rely on a particular behavior. This would be less cooperative from the game theory perspective, but may be a viable option too.

Figure 3:
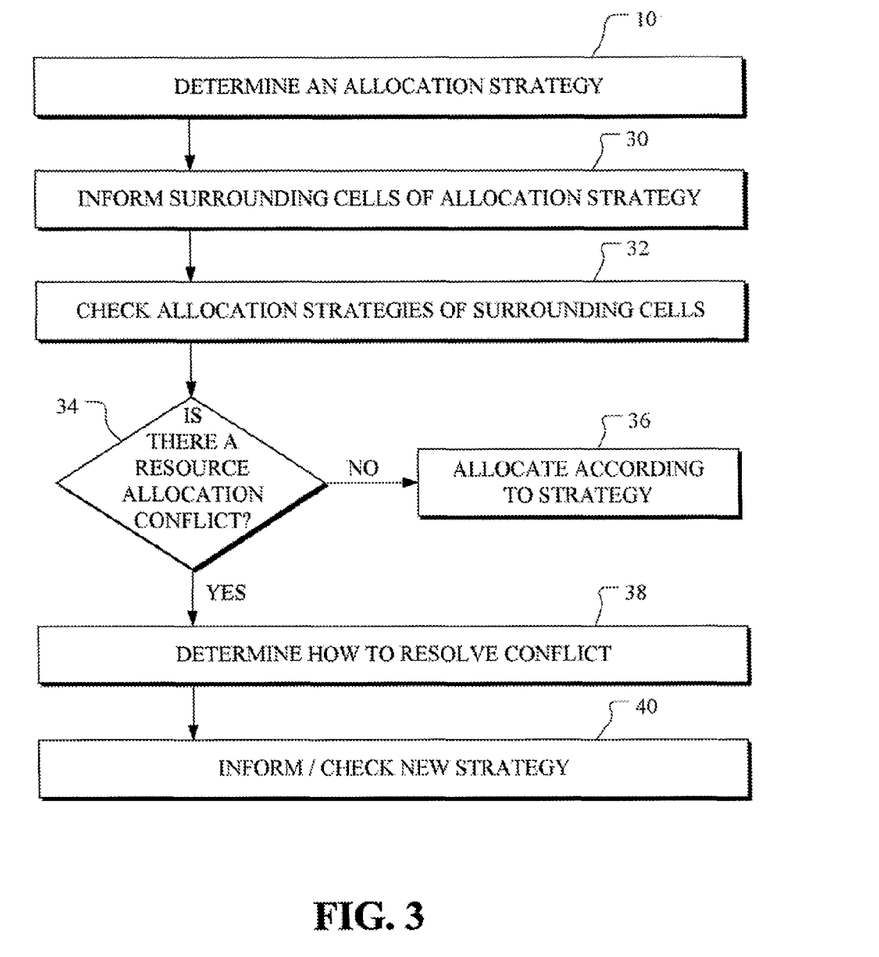
FIG. 3 is a flowchart showing one way to carry out the present invention in a base station.

FIG. 3 is a flowchart showing steps that may be carried out in a base station to inform its surrounding neighbors about its resource allocation strategy. In a step 10, a base station determines its own resource allocation strategy. In a step 30, it then informs surrounding cells about its own resource allocation strategy, e.g., for allocating orthogonal resources of the informing cell. The step 30 may be skipped if the strategy has already been informed in the past and is a static or semi-static strategy. As shown in a step 32, the informing cell may also check resource allocation strategies of the surrounding cells indicative of allocation strategies of the surrounding cells, e.g., for allocating orthogonal resources of the surrounding cells. These strategies may be more or less permanent (static or semi-static) strategies and may already have been communicated to the base station. The base station will in that event already have valid strategies from the other base stations, i.e., so there is not in such a case any current need to communicate strategies with the surrounding base stations. But it is certainly possible in some cases for step 32 to involve a communication with one or more surrounding base stations to find out (send, receive, or both send and receive) current strategies.

The informing base station may then decide if there is a conflict or not, as shown in a step 34. If not, the informing cell may allocate the resources, e.g., the orthogonal resources of the informing cell according to both said resource allocation strategy of the informing cell and the resource allocation strategies received from the surrounding cells so as to reduce interference in the system.

If there is a conflict, a step 38 is carried out to determine how to resolve the conflict. For instance, one or more rules may defined for a case where said informing cell and a cell from said surrounding cells indicate a same strategy. Such a rule might for instance be that a cell with a smaller identification number tries to find another strategy. A further communication step 40 may then be necessary to inform the conflicting cell and/or receive information from that cell about a new strategy. Note that the informing cell should not usually have to wait for any confirmation from other cells, it is basically free to do the desired allocation immediately. In a steady state system, the informing cell will have allocation strategies from surrounding cells available (from the past). If the informing cell wants to change its allocation strategy, it should be able to do that immediately, but should send signaling to the surrounding cells at the same time. It could also wait until the information has reached the other base stations, but that should be implementation specific.

The various strategies used may contain different kinds of information. For instance, the information might be about how much interference a cell will produce to the surrounding cells on different groups of orthogonal resources. Such orthogonal resources might for example be subcarriers or groups of subcarriers in an orthogonal frequency division multiplexed system.

The step 30 might involve the cell informing its strategy comprising allocating a frequency range where it will produce small interference, that is, where it allocated the frequency range to user equipment near a cell center.

Alternatively, the cell might inform its strategy comprising allocating a frequency range where it will produce large interference, that is, where it allocated a frequency range to user equipment near a cell edge.

The informing and receiving may take place over interfaces between base stations of the informing cell and the surrounding cells. Such an interface may comprise the X2 interfaces of a long term evolution architecture shown in FIG. 1.

Figure 4:
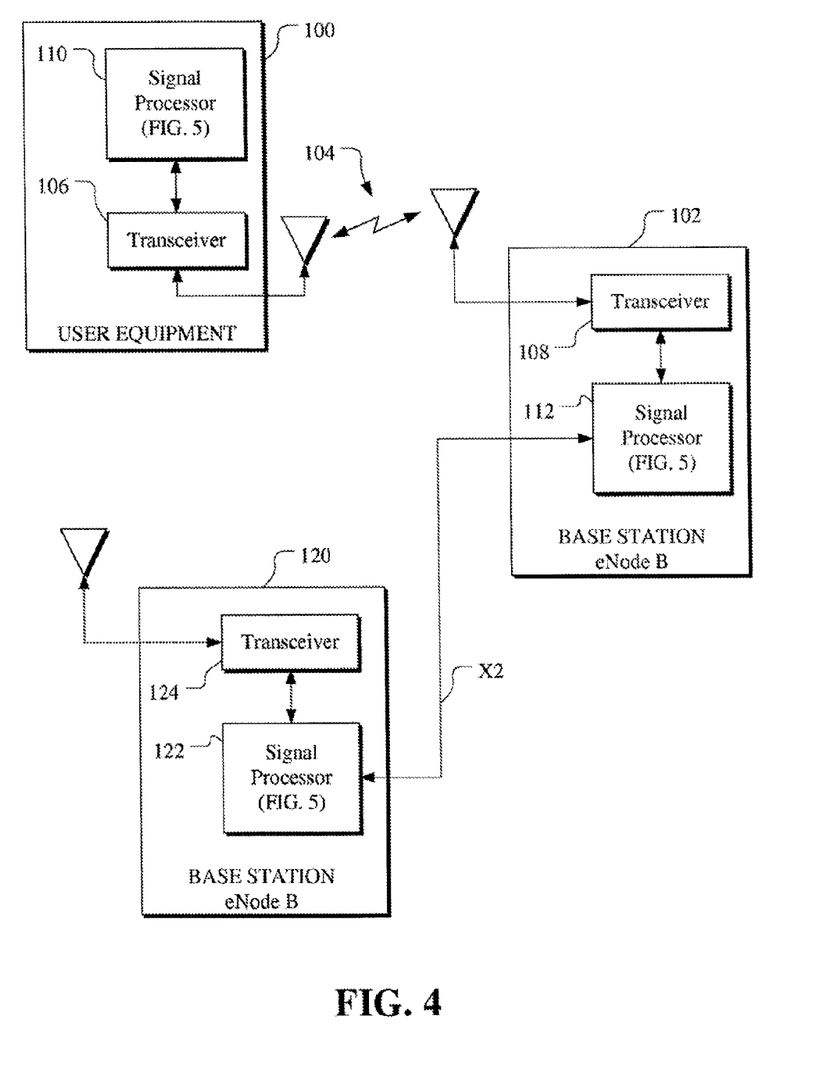
FIG. 4 shows components of a base station in communication with user equipment in a cell and another, neighboring base station in its own cell.

FIG. 4 shows a system comprising user equipment 100 in a cell and a base station (called "eNode B" in LTE) 102 in that same cell that is in communication with the UE 100 over an air interface 104. Both the user equipment 100 and the base station 102 include a transceiver 106, 108 and a signal processor 110, 112. The signal processors may take various forms including but not limited to the form of processor shown in FIG. 5. Each transceiver is coupled to an antenna and communications between the user equipment and the base station take place over a wireless interface 104. The scheduling request channel is an uplink channel within LTE. As such, the eNodeB 102 allocates and signals the resources to the UEs in its cell.

Figure 5:
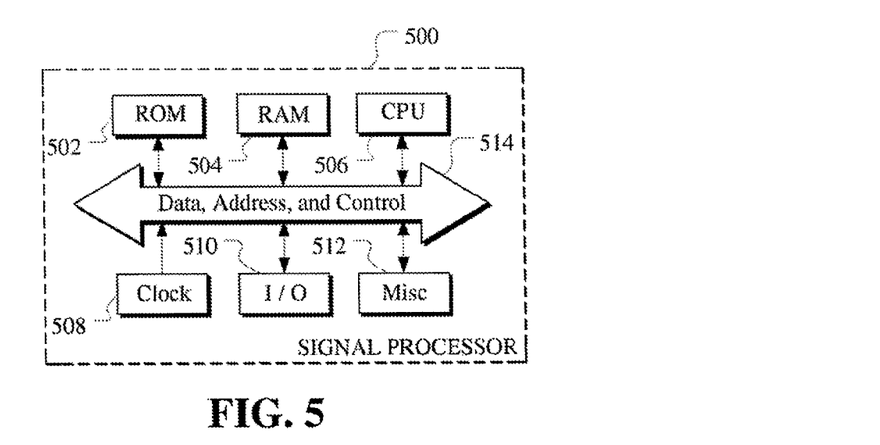
FIG. 5 shows details of a signal processor.

The signal processor of base station 102 may take the form shown in FIG. 5 and as such comprises program code for carrying out the steps of FIG. 3. The illustrated transceiver 108 of the base station of course includes both a receiver and a transmitter.

FIG. 5 shows a general purpose signal processor suitable for carrying out the signal processing functions shown above. It includes a read-only-memory (ROM) 502, a random access memory (RAM) 504, a central processing unit (CPU) 506, a clock 508, an input/output (I/O) port 510, and miscellaneous functions 512, all interconnected by a data, address and control (DAC) bus 514. The ROM is a computer readable medium that is able to store program code written to carry out the various functions described above in conjunction with the RAM, CPU, I/O, etc. Of course, it should be realized that the same signal processing function may be carried out with a combination of hardware and software and may even be carried out entirely in hardware with a dedicated integrated circuit, i.e., without software.

Referring back to FIG. 4, another base station 120, from a neighboring cell is shown connected to base station 102 by an LTE X2 interface. This interface may be uses to communicate the strategies of the neighbor base stations as shown in steps 30, 32 and 40 of FIG. 3. The neighboring cell 120 may also comprise a signal processor 122 and a transceiver 124 similar to that shown in the base station 102. The UE 100 is, by virtue of the invention, a UE with resources allocated according to the invention.

What is claimed is:

1. Method, comprising;
    a cell of a cellular system determining a resource allocation strategy of said cell for allocating orthogonal resources of the cell,
    said cell also checking resource allocation strategies of surrounding cells indicative of allocation strategies of said surrounding cells for allocating orthogonal resources of said surrounding cells, and said cell allocating said orthogonal resources of the cell according to both said resource allocation strategy of the cell and the resource allocation strategies of the surrounding cells so as to reduce interference in the system; wherein the resource allocation strategy of a surrounding cell is indicative for the interference from said surrounding cell experienced by a user equipment of the cell with regard to the relative position of the user equipment between the cell and said surrounding cell.

2. The method of claim 1, wherein the strategy contains information about how much interference it will produce to said surrounding cells on different groups of orthogonal resources.

3. The method of claim 1, wherein the orthogonal resources are subcarriers or groups of subcarriers in an orthogonal frequency division multiplexed system.

4. The method of claim 1, wherein said cell determines said strategy by allocating a frequency range where it will produce small interference, that is, allocating said frequency range to user equipment near a cell center.

5. The method of claim 1, wherein said cell determines said strategy by allocating a frequency range where it will produce large interference, that is, allocating said frequency range to user equipment near a cell edge.

6. The method of claim 1, further comprising said cell informing said resource allocation strategy to said surrounding cells and wherein said checking includes receiving said resource allocation strategies of said surrounding cells on interfaces between base stations of said cell and said surrounding cells.

7. The method of claim 6, wherein said interfaces comprise X2 interfaces of a long term evolution architecture.

8. The method of claim 6, wherein rules are defined for a case where said informing cell and a cell from said surrounding cells indicate a same strategy.

9. The method of claim 8, wherein such a rule is that a cell with a smaller identification number tries to find another strategy.

10. Apparatus for a cell of a cellular system configured to
determine a resource allocation strategy of said cell for allocating orthogonal resources of the cell;
to check resource allocation strategies of surrounding cells indicative of allocation strategies of said surrounding cells for allocating orthogonal resources of said surrounding cells; and
to allocate said orthogonal resources according to both said resource allocation strategy of the cell and the resource allocation strategies of the surrounding cells so as to reduce interference in the system; wherein
the resource allocation strategy of a surrounding cell is indicative for the interference from said surrounding cell experienced by a user equipment of the cell with regard to the relative position of the user equipment between the cell and said surrounding cell.

11. The apparatus of claim 10, wherein the strategy contains information about how much interference it will produce to said surrounding cells on different groups of orthogonal resources.

12. The apparatus of claim 10, wherein the orthogonal resources are subcarriers or groups of subcarriers in an orthogonal frequency division multiplexed system.

13. The apparatus of claim 10, wherein said cell determines said strategy by allocating a frequency range where it will produce small interference, that is, where it allocated said frequency range to user equipment near a cell center.

14. The apparatus of claim 10, said cell determines said strategy by allocating a frequency range where it will produce large interference, that is, where it allocated said frequency range to user equipment near a cell edge.

15. The apparatus of claim 10, configured to inform said strategy to said surrounding cells and to receive said strategies of said surrounding cells on interfaces between base stations of said cell and said surrounding cells.

16. The apparatus of claim 15, wherein said interfaces comprise X2 interfaces of a long term evolution architecture.

17. The apparatus of claim 15, wherein rules are defined for a case where said cell and a cell from said surrounding cells indicate a same strategy.

18. The apparatus of claim 17, wherein such a rule is that a cell with a smaller identification number tries to find another strategy.

19. Apparatus, comprising:
means for a cell of a cellular system to determine a resource allocation strategy of said cell for allocating orthogonal resources of the cell,
said apparatus also comprising means for checking resource allocation strategies of surrounding cells indicative of allocation strategies of said surrounding cells for allocating orthogonal resources of said surrounding cells, and
said apparatus further comprising means for allocating said orthogonal resources of the cell according to both said resource allocation strategy of the cell and the resource allocation strategies of the surrounding cells so as to reduce interference in the system,
wherein the resource allocation strategy of a surrounding cell is indicative for the interference from said surrounding cell experienced by a user equipment of the cell with regard to the relative position of the user equipment between the cell and said surrounding cell.

* * * * *